United States Patent [19]
Yoshioka et al.

[11] Patent Number: 5,719,850
[45] Date of Patent: Feb. 17, 1998

[54] OPTICAL STORAGE MEDIUM WITH FIRST LAYER CONTAINING OPTICALLY READABLE INFORMATION OVERLYING SECOND LAYER CONTAINING VISIBLE INFORMATION

[75] Inventors: Kenji Yoshioka, Tokyo; Osamu Konno, Iruma, both of Japan

[73] Assignee: Olympus Optical Co., Ltd., Tokyo, Japan

[21] Appl. No.: 479,548

[22] Filed: Jun. 7, 1995

Related U.S. Application Data

[63] Continuation of Ser. No. 955,323, Oct. 1, 1992, abandoned.

[30] Foreign Application Priority Data

| Oct. 3, 1991 | [JP] | Japan | 3-256296 |
| Jun. 9, 1992 | [JP] | Japan | 4-149268 |
| Jun. 9, 1992 | [JP] | Japan | 4-149269 |

[51] Int. Cl.⁶ ............................................. G11B 7/243
[52] U.S. Cl. ................................................... 369/283
[58] Field of Search ............................ 369/383, 386–388; 235/468, 488; 430/495, 945

[56] References Cited

U.S. PATENT DOCUMENTS

| 3,869,301 | 3/1975 | Decker et al. | 117/36.1 |
| 4,269,473 | 5/1981 | Flothmann et al. | 350/3.61 |
| 4,663,518 | 5/1987 | Borror et al. | 235/468 |
| 4,680,460 | 7/1987 | Drexler | 235/488 |
| 4,711,996 | 12/1987 | Drexler | 235/468 |
| 4,839,883 | 6/1989 | Nagata et al. | 369/283 |
| 4,845,021 | 7/1989 | Miyazaki et al. | 430/495 |
| 4,866,672 | 9/1989 | Terao et al. | 369/283 |
| 5,010,243 | 4/1991 | Fukushima et al. | 235/488 |
| 5,024,926 | 6/1991 | Itoh et al. | 430/495 |
| 5,138,604 | 8/1992 | Umeda et al. | 369/103 |
| 5,147,701 | 9/1992 | Furukawa et al. | 369/283 |
| 5,196,250 | 3/1993 | Abe et al. | 369/283 |
| 5,197,049 | 3/1993 | Wehrenberg | 369/284 |
| 5,292,616 | 3/1994 | Fujita et al. | 369/283 |

FOREIGN PATENT DOCUMENTS

| 61-214151 | 9/1986 | Japan | 369/283 |
| 64-16696 | 1/1989 | Japan . | |
| 64-16697 | 1/1989 | Japan . | |
| 64-23439 | 1/1989 | Japan . | |
| 2269097 | 11/1990 | Japan | 369/283 |
| 0033183 | 1/1991 | Japan | 369/283 |
| 4-163735 | 6/1992 | Japan | 369/283 |

*Primary Examiner*—Stuart S. Levy
*Assistant Examiner*—Brian E. Miller
*Attorney, Agent, or Firm*—Frishauf, Holtz, Goodman, Langer & Chick

[57] ABSTRACT

An optical card comprising an optical storage material for optically storing information and a visible information layer for storing visible information. The optical storage material has specific light transmittance to cause visible light to arrive at the visible information layer so that the visible information is observed through the optical storage material.

11 Claims, 11 Drawing Sheets

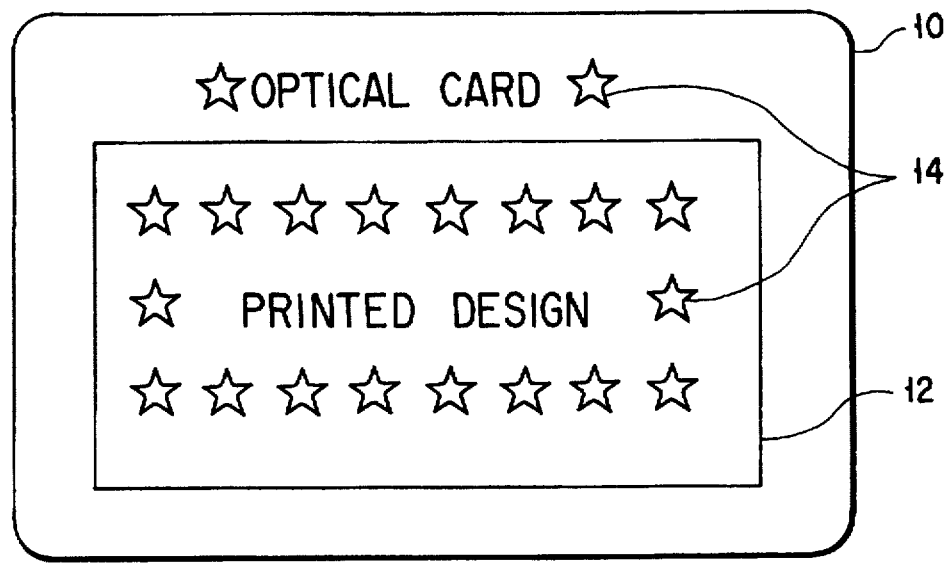
F I G. 5
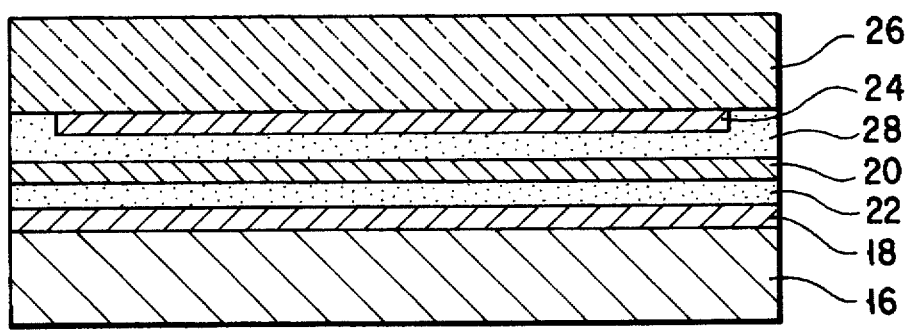
F I G. 6

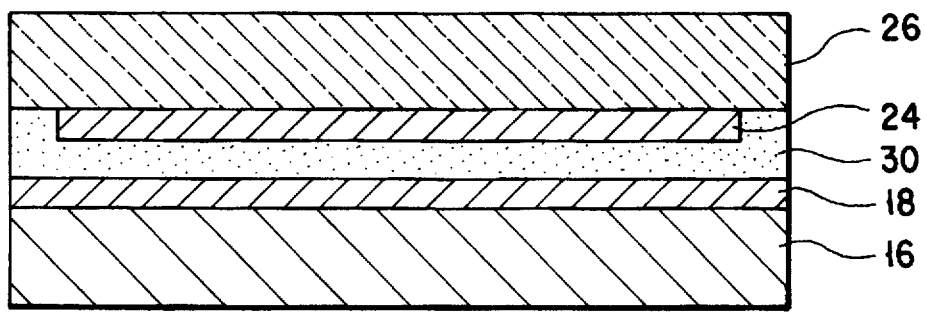
F I G. 9
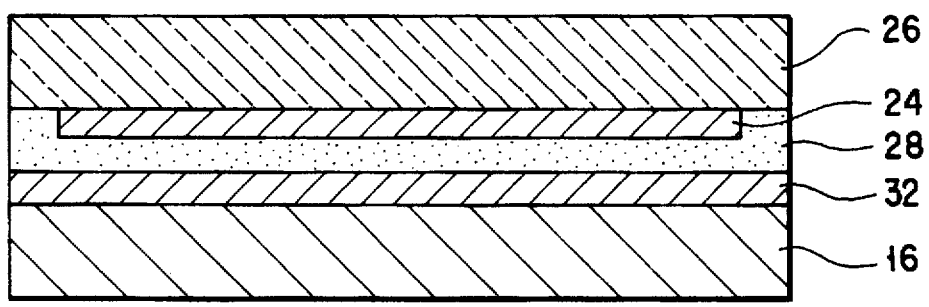
F I G. 10
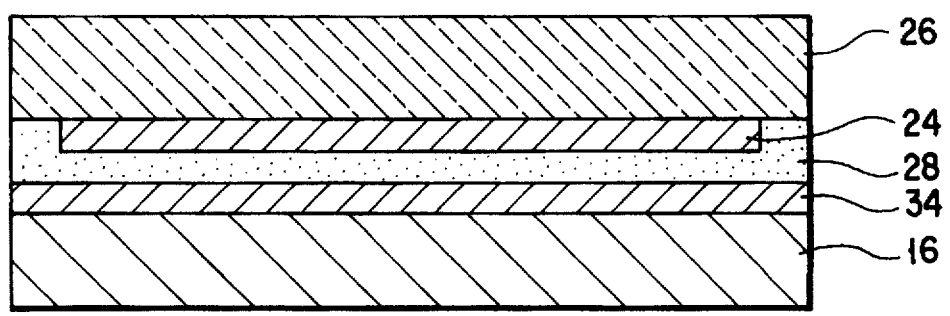
F I G. 11

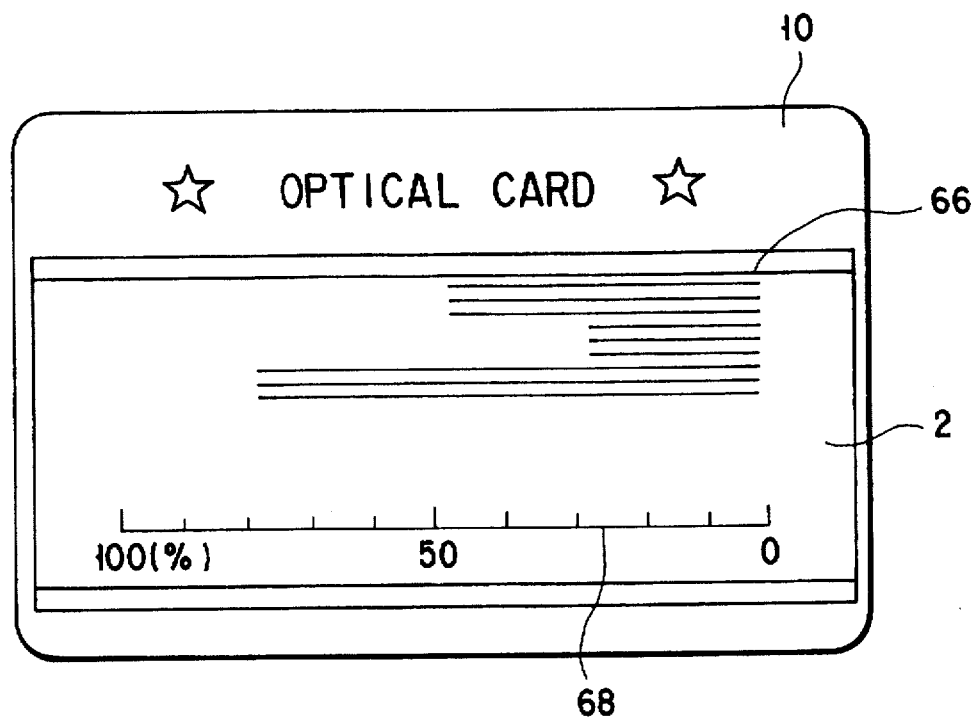
F I G. 15
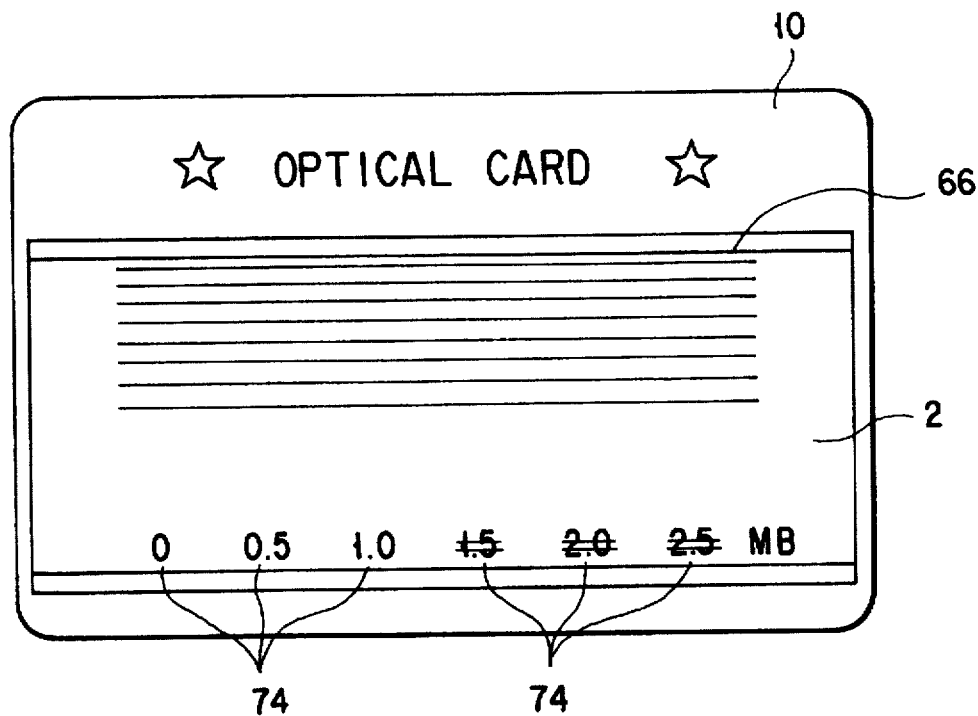
F I G. 16

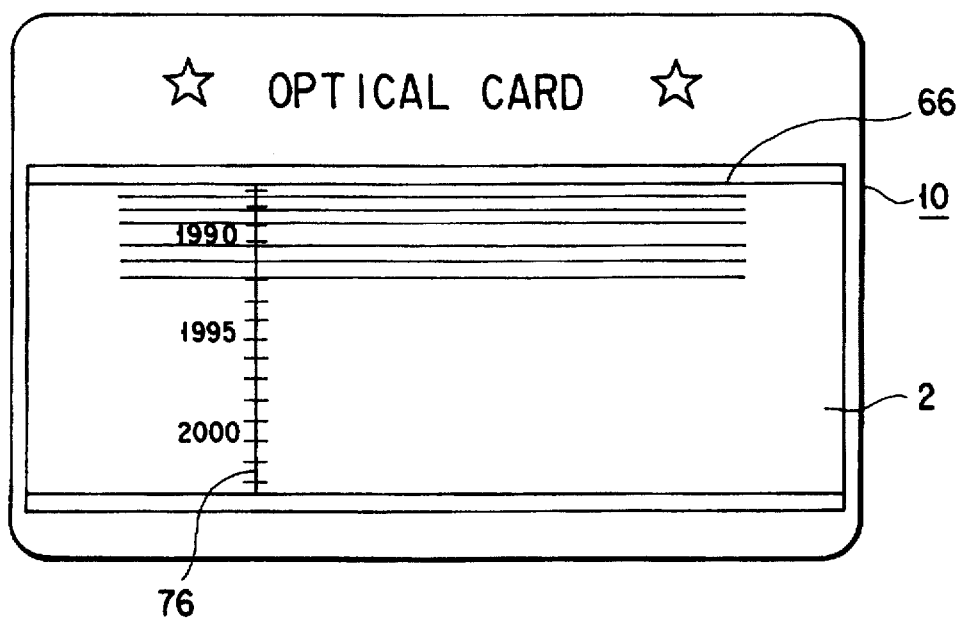
F I G. 17
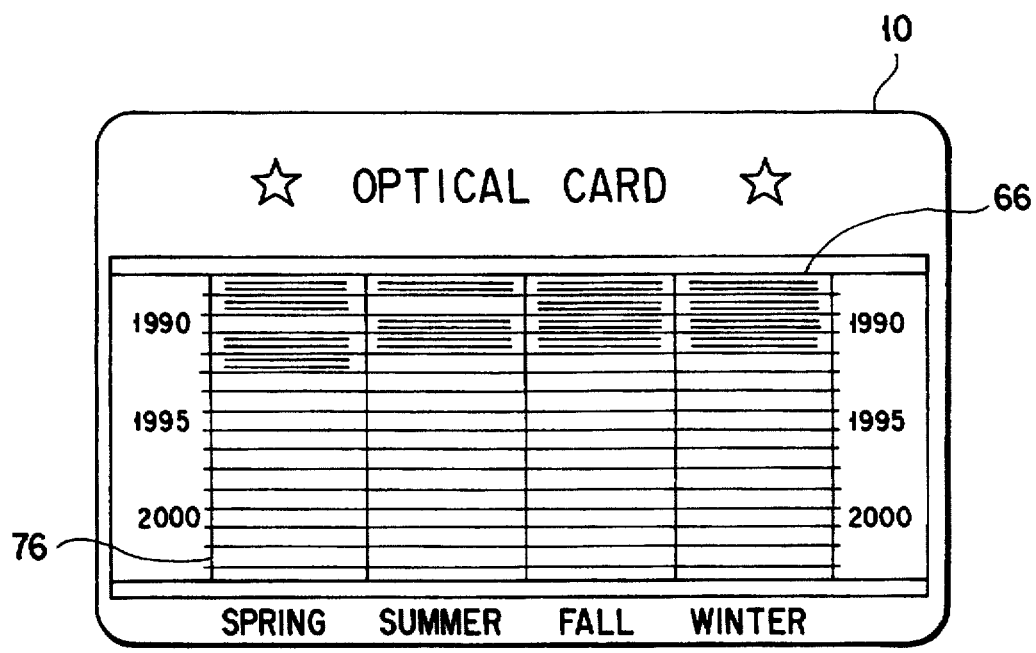
F I G. 18

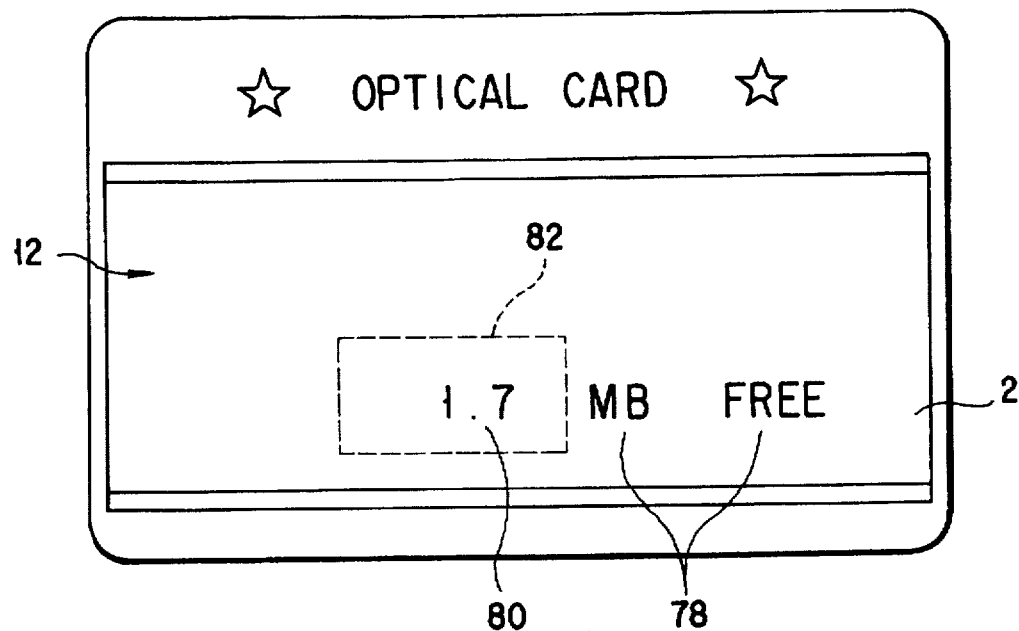
F I G. 19
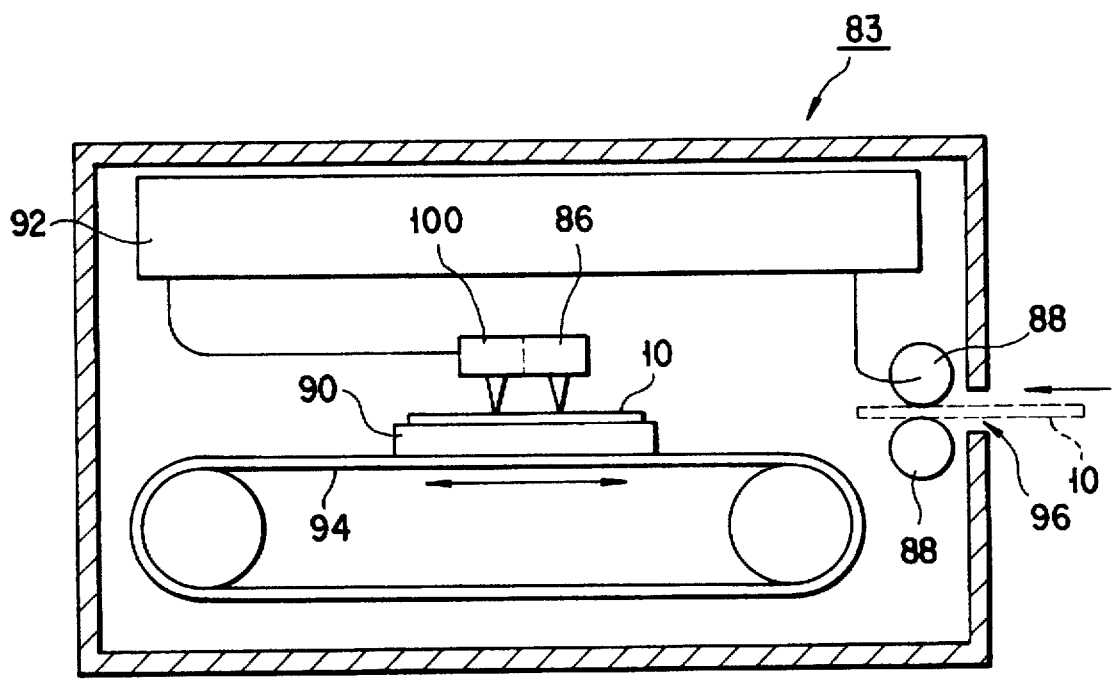
F I G. 20

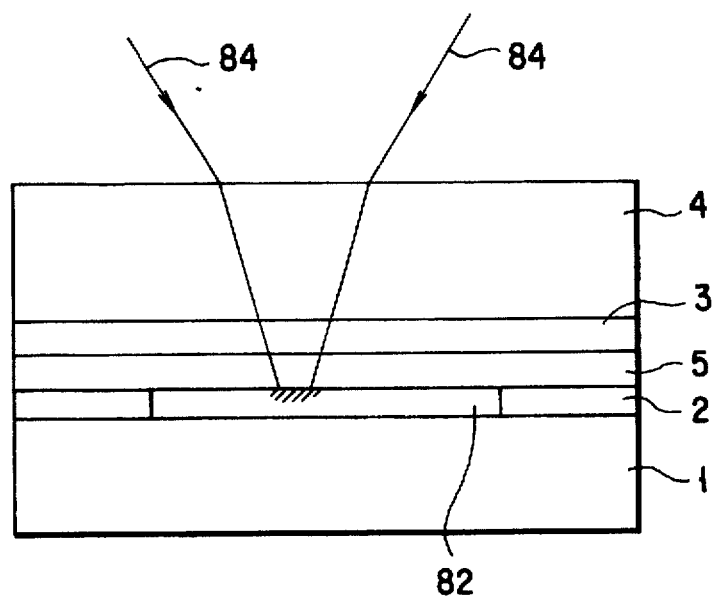
F I G. 21

OPTICAL STORAGE MEDIUM WITH FIRST LAYER CONTAINING OPTICALLY READABLE INFORMATION OVERLYING SECOND LAYER CONTAINING VISIBLE INFORMATION

This application is a Continuation of application Ser. No. 07/955,323, filed Oct. 1, 1992, abandoned.

BACKGROUND OF THE INVENTION

1. Field of the Invention

This invention relates to an optical storage medium having an optical storing layer for optically storing information which is recorded and reproduced by light beams, and more particularly to an optical information storing medium having a visible information storage layer.

2. Description of the Related Art

Optical discs, optical cards and the like have been known as optical storage media. In particular, there have been developed optical cards which can store much more information than the conventional magnetic cards, with these developed optical cards having the same size as the conventional magnetic cards. These optical cards are information storage media for carrying out storage and reproduction of information by means of light beams and are classified as a ROM type (Read-Only-Memory type), a WORM type (a Write-Once-Read-Many type) and a rewriting type.

Information is recorded by light beams such as laser beams which are emitted to produce pits, bubbles or phase variations on the optical storage material of the optical card. The information is reproduced by means of reflecting of light beams. Nowadays, magneto-optical material, phase-changing material and photochromism material are put to practical use as WORM type and rewriting type optical information storage material.

Recently, there has been required an optical card which is provided with a visible information storage layer. This is because the optical card is desired to have not only its inherent quality and improved performance but also added values such as functionality and fashionability. This demand for the optical card is also directed to other optical storage media.

With the conventional optical card used as an optical storage medium, the optical card has an upper surface where a light transmitting layer is disposed and the light beam is incident, and has a lower surface where a substrate is disposed. The optical storage material is interposed between the upper surface and the lower surface. Therefore, the visible information storage layer is able to be formed only on an entire area viewed from the lower surface and on a partial area where the optical storage material does not exist as viewed from the upper surface. Thus, the conventional optical storage medium is insufficient in view of its design.

SUMMARY OF THE INVENTION

Accordingly, it is an object of this invention to provide an optical storage medium which makes it possible to form a visible information storage layer on all of the areas which include a partial area where the optical storage material is existent as viewed from the upper surface in the optical storage medium.

In order to achieve this object, an optical storage medium according to this invention comprises a first layer for optically storing information and a second layer for storing visible information, the first and second layers being formed above one another and the first layer having specific light transmittance to cause visible light to be incident on the second layer.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 5 is a top plan view of an optical card which is the second embodiment of an optical storage medium according to this invention;

FIG. 6 is a longitudinal cross-sectional view of the optical card of FIG. 5;

FIG. 9 is a longitudinal cross-sectional view of an optical card which is the third embodiment of an optical storage medium according to this invention;

FIG. 10 is a longitudinal cross-sectional view of an optical card which is the fourth embodiment of an optical storage medium according to this invention;

FIG. 11 is a longitudinal cross-sectional view of an optical card which is the fifth embodiment of an optical storage medium according to this invention;

FIG. 15 is a top plan view of an optical card which is the eighth embodiment of an optical storage medium according to this invention;

FIG. 16 is a top plan view of an optical card which is the ninth embodiment of an optical storage medium according to this invention;

FIG. 17 is a top plan view of an optical card which is the tenth embodiment of an optical storage medium according to this invention;

FIG. 18 is a top plan view of a modification of the optical card of the tenth embodiment;

FIG. 19 is a top plan view of an optical card which is the eleventh embodiment of an optical storage medium according to this invention;

FIG. 20 shows the interior structure of the reader/writer for the optical card of FIG. 19; and FIG. 21 is a longitudinal cross-sectional view of the optical card of FIG. 19.

DETAILED DESCRIPTION OF THE PREFERRED EMBODIMENTS

An optical card which is the first embodiment of an optical storage medium according to this invention will now be described in detail with reference to FIGS. 1 and 2.

Figure 1:
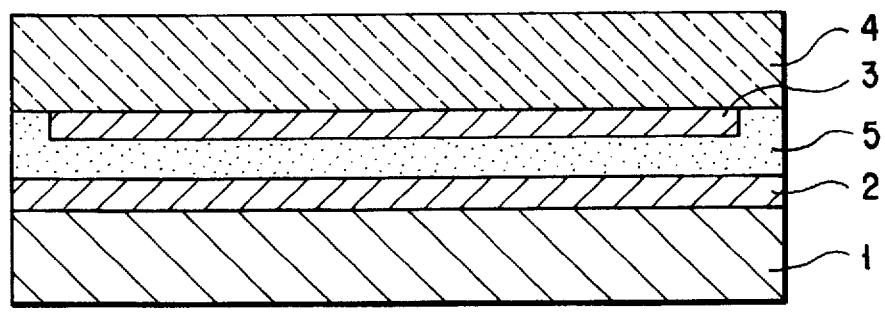
FIG. 1 is a longitudinal cross-sectional view of an optical card which is the first embodiment of an optical storage medium according to this invention.

In FIG. 1, a card substrate 1 is made of white vinyl chloride and has a thickness of 0.3 mm. On the upper surface of card substrate 1 is formed a multi-color visible information layer or a printed design layer (second layer) 2 by silk printing means so that the printed design layer 2 extends over the whole area of the upper surface of the card substrate 1. Optical storage material (first layer) 3 having visible light transmittance of a predetermined value or more is located on the printed design layer 2 by means of an adhesive 5 having light transmittance. The optical storage material 3 is formed on the lower surface of a light transmitting layer 4 having a thickness of 0.4 mm and made of polycarbonate. The optical storage material 3 is deposited on the lower surface of the light transmitting layer 4 by sputtering a Te-Se alloy. The adhesive 5 is made of epoxy-series material.

Figure 2:
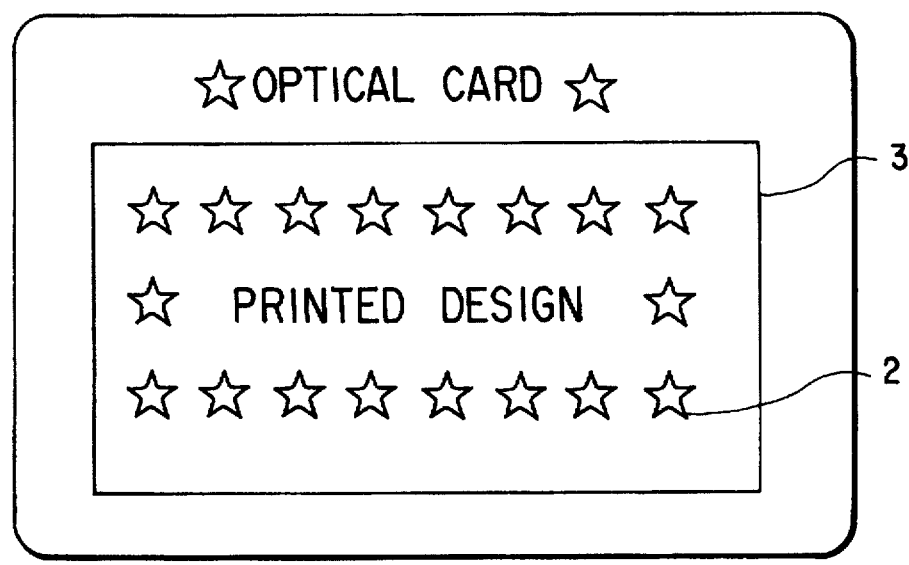
FIG. 2 is a top plan view of the optical card shown in FIG. 1.

In FIG. 2, the printed design layer 2 is disposed under the optical storage material 3 such that the design printed on the layer 2 can be observed through the optical storage material 3.

The card substrate 1, the printed design layer 2, the adhesive 5, the optical storage material 3 and the light transmitting layer 4 are laminated one after another to be punched into an 86 mm×54 mm card size to form an optical card according to the present embodiment.

The optical card according to this embodiment has a visible light transmittance of 30%.

Since the printed design layer 2 can be set irrespective of the region of the optical storage material 3 in this optical card, the printed design layer can be formed on the whole area of the optical card as seen from the upper surface thereof. Needless to say, the printed design layer 2 can be formed not always on the whole area as viewed from the upper surface of the optical card but can be prepared on part of the optical card.

The card substrate 1 is intended to protect the optical storage material and to maintain the mechanical strength of the body of the optical card. So long as this object is attained, any material can be used for the card substrate 1. The material is, for example, resin material such as polyvinyl chloride, polycarbonate, polyethylene or the like. In some cases, a metal plate, ceramic material, paper material or the like can be used. The card substrate may be opaque or transparent.

The design on the printed design layer 2 can be obtained by an ordinary printing method, a method of forming depressions and projections on the card substrate 1 by etching or the like process, a method of printing in accordance with these depressions and projections, a method of storing variable information by utilizing phase changes of organic macro-molecules or the like, or other similar methods. Printing methods which are generally used are, for example, silk printing, offset printing, gravure printing and the like. Printing ink is selected from the ones suited for the printing method and the material of card substrates. Stored visible information is not limited to particular ones and may take the form of letters, figures, marks, logos and the like.

The optical storage material 3 is any material on which information is recorded and from which the information is reproduced. The material 3 may be of MOS type, WORM type or reading type and it may be bubble type, phase changing type and hole forming type. For the recording purpose, hole forming type, bubble type and phase changing type are well known, but any type of the optical storage material may be used so long as it can change its reflectivity of reproduced light beams according to the contents of the recorded information. Magneto-optical material using magneto-optic effects or organic dye can also be used as the optical storage material 3.

The satisfactory characteristics which are described above may be obtained by well known ordinary optical storage material. Specifically, the material is a metal having a low melting point such as Te, Bi, Al, Se, Sn, or In or an alloy, including one or more of these metals as the main components, such as TeGeSb, TeSeSn or TbFeCo. Cyanine-series, polymethine-series or naphthoquinone-series dye can also used as optical storage layer material 3. It should be pointed out, however, that visible light transmittance of the material 3 must be a predetermined value or more in order to make effective the printed design of the layer 2.

Since the printed design is observed through the optical storage material, the quality of design is much influenced not only by the color of the optical storage material, its drawn state and color tones but also by light transmittance of the optical storage material. When the user looks at the printed design at the upper surface of the optical card, the contrast of the printed design depends on the light transmittance of the light storage medium. Thus, it is desirable that the visible light transmission of the optical storage medium be as high as possible so long as the transmission does not influence recording/reproducing characteristics. Such transmittance is 1% or more, and preferably 10% or more.

It is sufficient that the light transmitting layer 4 is designed such that visible light and light beams for record/reproduction pass through it. The material of the light transmitting layer 4 is, for example, polymethyl methacrylate (PMMA), polycarbonate, polyvinyl chloride or glass. The light transmitting layer 4 is desirably made of material having high transparency and a low double-refraction rate. However, when the design is illustrated effectively, the light transmitting layer 4 can be colored so long as the read/write characteristics are not adversely effected. The light transmitting layer 4 may have or may not have a guide groove.

The adhesive 5 having a high adhering strength and causing little adverse effect must be selected. The adhesive 5 must have such a degree of light transmittance as the printed design 2 can be observed at the upper surface of the optical card. The material of the adhesive 5 is, for example, epoxy-series, urethane-series or acryl-series material.

Figure 3:
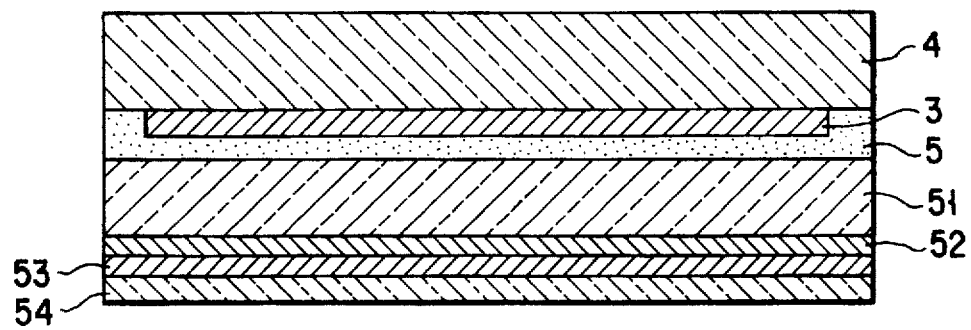
FIG. 3 is a longitudinal cross-sectional view of a modification of the optical card shown in FIG. 1.

A modification of the optical card of this embodiment is shown in FIG. 3. The elements 3 to 5 are the same as those of optical card shown in FIG. 1. In FIG. 3 there are shown a transparent substrate 51, printed layers 52 and 53 and a transparent protection layer 54. The printed layer 52 has a design printed thereon so as to be observed at the side of the transparent substrate 4, and the printed layer 53 has a design printed thereon so as to be observed from the transparent protection layer 54.

When designs are printed on the whole area of the printed layer 51 and the light transmittance of the optical storage material 3 for visible light is selected to a constant value or more, it is clear that the modification exhibits the same technical effects as the first embodiment of this invention.

Prior to the explanation of the second to fifth embodiments of optical storage media according to this invention, there will be explained the conceptional process of the embodiments deduced from this invention.

In some occasions, the optical storage material of the optical card of the first embodiment as shown in FIG. 1 allows not only visible light but also infrared radiation used for recording and reproducing information to pass therethrough simultaneously. Further, when the printed design layer 2 has high reflectivity for infrared radiation, the following problems will arise (in FIG. 4, hatching is omitted for simplicity and the thickness of the optical storage material 3, the adhesive 5 and the printed design are exaggerated).

Figure 4:
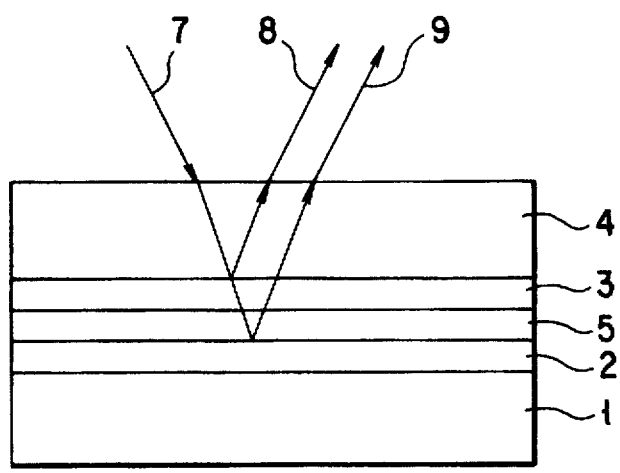
FIG. 4 illustrates relation between the optical card shown in FIG. 1 and optical beams.

As shown in FIG. 4, an incident ray 7 for reading data is reflected by the optical storage material 3 which records the digital data and the reflected ray 8 is used as a reproduction signal.

On the other hand, the optical storage material 3 has high light transmittance, and part 9 of the light transmitted through the optical storage material 3 is reflected or scattered by the printed design layer 2 and overlaps the reflected ray 8 which becomes a data reproduction signal, generating a noise in the reproduction signal. Such noise is also created from the difference of light reflectivity due to the nature of the printed design layer 2, variations of grain of printing or the like.

The second to fifth embodiments have been deduced from this in the course of this conception and are intended to provide an optical storage media which produce excellent signals having a low noise component.

In order to achieve this object, the optical card is provided with light preventing material (hereinafter referred to as the "preventing material"). Provision of the preventing material prevents the generation of the noise due to reflection of recording/reproduction light beams passing through the optical storage material on and scattering of the same from the surface of the visible information storage layer. The preventing material is material for selectively absorbing or reflecting light having specific wavelengths.

An optical card which is the second embodiment of the optical storage medium of this invention will now be described with reference to FIGS. 5 and 6.

As the optical card 10 which is the optical storage medium of this embodiment is viewed from above in FIG. 5, an optical storage region 12 extends over a predetermined area on the optical card 10, and design 14 is formed on the whole area of the region 12.

In FIG. 6, a card substrate 16 is made of white vinyl chloride. On the upper surface of the card substrate 16 is formed a multi-color visible printed design layer 18 by silk printing means. The printed design of the layer 18 can be the printed design 14 shown in FIG. 5 from above the optical card 10.

A light reflecting layer, which is the layer 20 for preventing only predetermined light from being incident on the printed design layer 18, is provided on the layer 18 by means of an adhesive 22. The light reflecting layer is made of such material as allows visible light to pass therethrough and as reflects or absorbs the infrared radiation of 830 nm which is used for information recording/reproduction.

A light transmitting layer 26 formed on its lower surface with optical storage material 24 is fixed onto the preventing layer 20 by an adhesive 28. The light transmitting layer 26 is made of polycarbonate.

When the optical card 10 in FIG. 5 is viewed from above, the optical storage material 24 can be observed as an optical storage region 12. The optical storage material 24 is formed on the lower surface of an optical transmitting layer 26 by sputtering TeSe alloy. Adhesives 22 and 28 are made of epoxy-series material. In FIG. 5, printed design 14 is disposed under the optical storage material 24.

A card substrate 16, a printed design layer 18, an adhesive 22, a light reflecting layer 20, an adhesive 28, an optical storage material 24 and a light transmitting layer 26 are laminated one after another to be punched into a credit card size of 86 mm×54 mm to form an optical card 10.

In the thus constructed optical card 10, the light beam for recording/reproducing which is incident to the optical card 10 passes through the light transmitting layer 26 and is incident on the optical storage material 24 such that information is reproduced from the material 24. Since the optical storage material 24 has a predetermined light transmission, part of light beams pass through the optical storage material 24. The light beams pass through the adhesive 28 and are reflected by the preventing material 20. Thus, the light beams do not arrive at the printed design layer 18. Therefore, there is no light beam reflecting from the printed design layer 18 so that no influence on the reproduction signal occurs. On the other hand, the normal visible light passes through the preventing material 20 and arrives at the printed design layer 18 such that the printed design 14 can be seen at the upper surface of the optical card 10 in FIG. 5.

The light reflecting layer which acts as preventing material 20 may be replaced by a light absorbing layer which selectively absorbs specific light beams. The absorbing layer has the same effect as the preventing material of the second embodiment. It is sufficient that the light preventing material 20 can selectively absorb or reflect light beams of specific wavelengths or a wave band. The wavelengths selectively absorbed by the light absorbing layer or selectively reflected on the light reflecting layer may be, corresponding to the light rays used for information storage and information reproduction, any wavelengths of infrared radiation, visible light, ultraviolet rays. It is advised that the material of the light absorbing layer and the light reflecting layer is color-filter material, organic macromolecular material, inorganic material, etc., but is not limited thereto.

Examples of the macromolecular material for absorbing infrared radiation are phthalocyanine dye, azulenium dye, etc. The visible-light absorbing material is selected, for example, from quinizarin dye and rhodamine dyestuff.

An infrared reflecting filter can be used as the preventing material 20 and its example is described below.

The infrared reflecting filter is an interference filter comprising two kinds of thin films having different refractive indexes and laminated on a substrate. With this filter, the wavelength of light beams to be reflected or transmitted can be arbitrarily selected by changing the refractive indexes and the thickness of the thin films.

Figure 7:
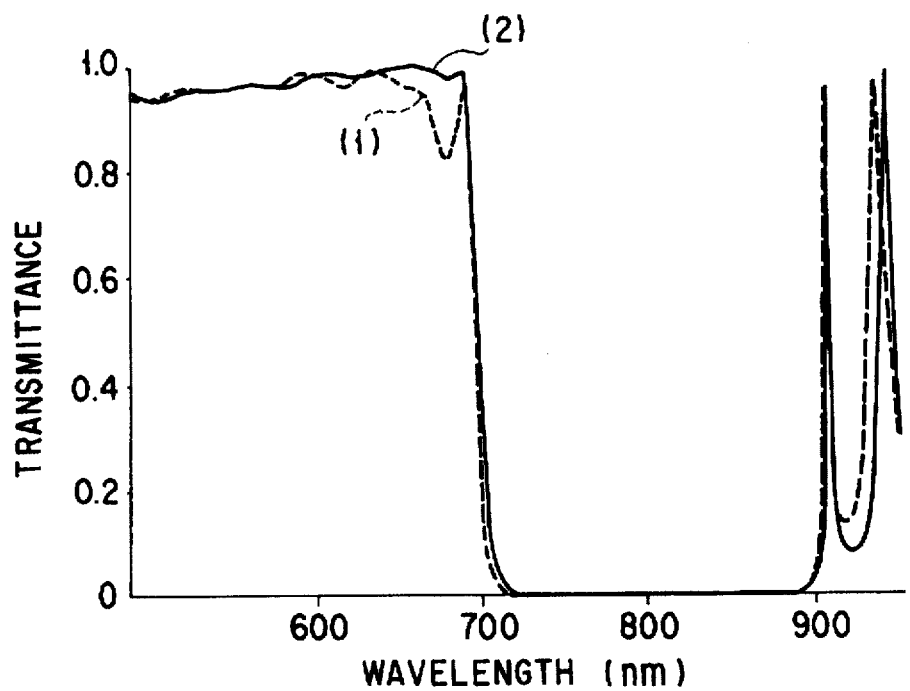
FIG. 7 is a graph illustrating each of the characteristics of two kinds of infrared reflection filters.
Figure 8:
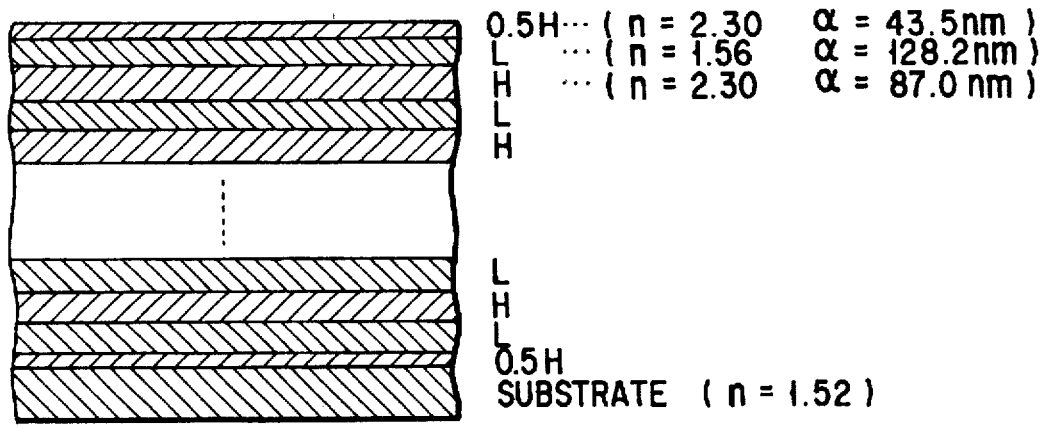
FIG. 8 is a general longitudinal cross-sectional view of an infrared reflection filter.
Figure 12A:
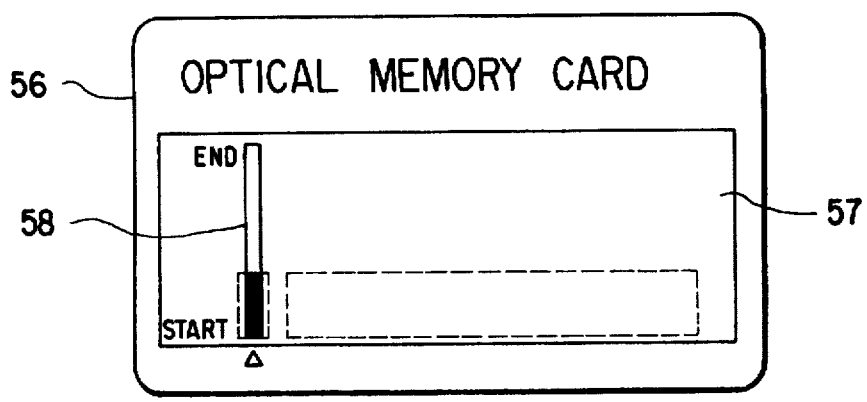
FIGS. 12A to 12C are top plan views of conventional optical cards.
Figure 12B:
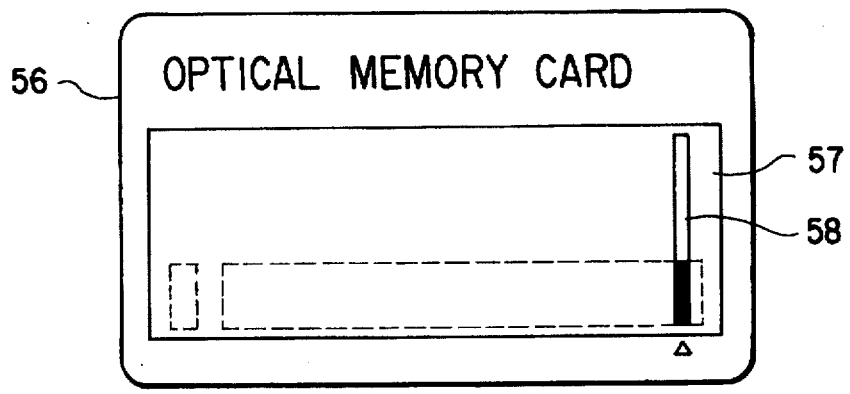
Figure 12C:
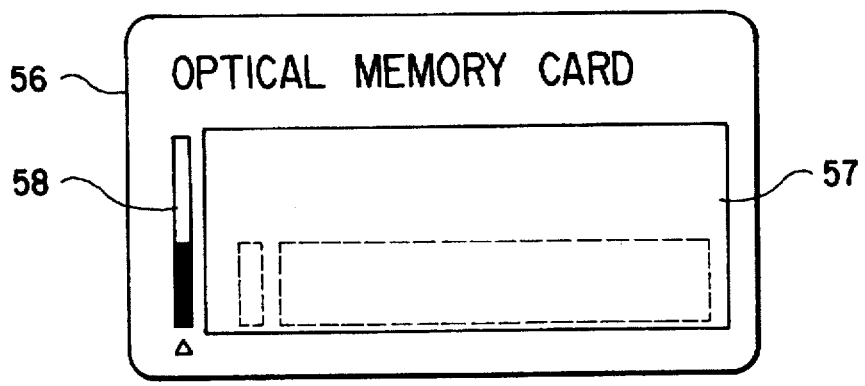

Infrared radiation reflecting filters for reflecting the light beams of the wavelength within the range of 800 nm±100 nm (700 to 900 nm) were manufactured. TiO$_2$ having a high refractive index ($n_H$=2.30) and SiO$_2$ having a low refractive index ($n_L$=1.56) were used as the material of the two thin films, respectively. The thin films were formed by vacuum deposition which is a normal method of manufacturing glass filters. Two kinds of laminated filters were manufactured. The characteristics of these filters are shown in FIG. 7 and the general cross-sectional view thereof is shown in FIG. 8.

The laminating conditions of these two kinds of filters are as follows:

$$1.00(0.5HL0.5H)^{15}|1.52 \text{ [broken line]} \quad (1)$$

$$1.00(0.5HL0.5H)^{12}|1.05\,(0.5HL0.5H)^{3}|1.52 \text{ [solid line]} \quad (2)$$

"H" and "L" are optical distances (nd) of the materials in which the wavelength of 200 nm is represented as a wavelengh unit. The wavelength of 200 nm is one-fourth of the central value 800 nm of the wavelength range to be reflected. "H" is for the material having a high refractive index, and "L" is for the material having a low refractive index.

In the concrete case, "0.5H" is attained by vacuum depositing $TiO_2$ material having a high refractive index such that its optical distance is equal to half the wavelength unit defined by the wavelength of 200 nm, i.e., 0.5×200=100 nm. The actual thickness "d" is 43.5 nm (=100 nm/2.3).

Similarly, "L" is attained by vacuum depositing $SiO_2$ material having a low refractive index such that its optical distance is equal to a wavelength unit, i.e., 200 nm. The actual thickness "d" is 128 nm (=200 nm/1.56).

The filter satisfying the laminating condition (1) has fifteen compound layers laminated one after another and each compound layer comprising two "0.5H" layers and an "L" layer sandwiched between two "0.5H" layers (as shown in the parenthesis). An air layer having a refracting index of 1.00 and a substrate having a refractive index 1.52 are disposed on the upper surface and the lower surface of the laminated fifteen compound layers, respectively. Two "0.5H" layers are stacked with each other in two adjacent compound layers of the parenthesis and provides a resultant thickness of "1H". Thus, it can be considered that the two "0.5H" layers form a film having a thickness of 87.0 nm.

In the filter satisfying the laminating condition (2), each of three compound layers positioned at the side of substrate (shown in the right-side parenthesis) in the fifteen laminated compound layers is made 1.05 times thicker than each of the remaining twelve compound layers. As shown in FIG. 7, the lowering of the light transmittance appearing at the wavelength of 690 nm in the filter under the laminating condition (1) cannot be observed in the filter under the laminating condition (2).

As shown in FIG. 8, each of the actual filters manufactured to satisfy the laminating conditions (1) and (2) has fifteen "1.0L" layers and fourteen "1.0H" layers and is alternately laminated between the "0.5H" layers at the upper and lower ends of the filter.

The light absorbing layer is made of material which absorbs light beams having a specific wave band, and the light reflecting layer is made of material which reflects light beams having a specific wave band. The material of both layers is not limited to the ones as mentioned above but any material can be employed so long as these layers allow at least part of visible light to pass therethrough such that the printed design can be observed from the outside of the optical card. When visible light is to be absorbed, it is desirable that the light absorbing layer have such an absorbing characteristic that the layer sharply absorbs the specific wave band of the visible light. However, when infrared radiation or ultraviolet radiation is to be absorbed, the absorption spectrum region can be set arbitrarily so long as at least part of visible light can pass through the light absorbing layer.

The light absorbing rate or light reflectivity of this selectively preventing material 20 may also depend on wavelengths of the visible light band. So long as the above-mentioned conditions are satisfied, the transmission-absorption characteristic or the reflecting characteristic may be of low-pass type, high-pass type, band-pass type, band absorbing type or band reflecting type.

The second embodiment of the optical card as shown in FIG. 6 is fundamentally based on the first embodiment of the optical card as shown in FIG. 1. However, it is clear that this can be easily applied to the optical card having the structure of that of FIG. 3. Needless to say, the same technical effect as the optical card of FIG. 6 is obtained by disposing a preventing material 20 between the optical storage material 3 and the printed design layer 52 in the optical card of FIG. 3.

The third embodiment will now be described with reference to FIG. 9. The elements of the third embodiment which have the same functions as the corresponding elements of the second embodiment are depicted by the Same reference numerals.

The adhesive 22 of the third embodiment has the function of the preventing material 20 of the second embodiment as shown in FIG. 6.

In FIG. 9, an adhesive 30 has a selective light-absorbing property or a selective light-reflecting property. The adhesive 30 may be made by mixing an ordinary adhesive used in the second embodiment with the shielding material (selective light-absorbing material or selective light-reflecting material) used in the second embodiment. As concrete material, the mixture of acryl-series adhesive with phthalocyanine dye, the mixture of epoxy-series adhesive with quinizarin dye or selected one from many other mixtures can be considered. There is no problem in that adhesive 30 itself has a selective light-absorbing property or a selective light-reflecting property. The material of the adhesive 30 is not limited so long as it has a selective light-absorbing property or a selective light-reflecting property.

The optical card of the third embodiment as shown in FIG. 9 has the same structure as that of FIG. 1. However, it is clear that it can be easily applied to the optical card having the same structure as that of FIG. 3. Needless to say, same technical effect as the optical card of FIG. 9 can be obtained by replacing the adhesive 5 of the optical card shown in FIG. 3 with the adhesive 30 having a light-preventing property as shown in FIG. 9.

The fourth embodiment will now be described with reference to FIG. 10. The elements of the fourth embodiment which have the same functions as the corresponding elements of the second embodiment are depicted by the same reference numerals.

In this embodiment, a printed design layer 32 has a property for selectively absorbing recording/reproducing light beams. Material having this feature is a mixture of ordinary printing ink with pigment such as carbon black or milori blue. Alternatively, a mixture of ordinary ink with material having selective light-absorbing property represented by phthalocyanine dye, azulenium dye or rhodamine dye can be used.

The optical card of the fourth embodiment as shown in FIG. 10 has the same structure as that of FIG. 1. However, it is clear that it can be easily applied to the optical card having the same structure as that of FIG. 3. Needless to say, the same technical effect as the optical card of FIG. 10 can be obtained by replacing the printed design layer 52 of the optical card shown in FIG. 3 with the printed design layer 32 having a selective light-absorbing property as shown in FIG. 10.

The fifth embodiment will now be described with reference to FIG. 11. The elements of the fifth embodiment which have the same functions as the corresponding elements of the second embodiment are depicted by the same reference numerals.

In this embodiment, the reflectivity distribution of the upper surface of the printed design layer provided at the lower side of the optical storage material 24 is made uniform for storage light beams and reproduction light beams.

A printed design layer 34 provides the reflectivity distribution for light beams for recording or reproducing which is made uniform at the optical storage region 12 (shown in FIG. 5). The uniform region of the reflectivity distribution is the same as the optical storage region 12 in FIG. 5.

When a design is formed on the printed design layer 34 by an ordinary printing method, ink which provides uniform reflectivity distribution for recording light beams or reproducing light beams may be selected. In particular, when infrared radiation is used for recording/reproducing, printing ink may be mixed with a proper combination of white, red and yellow pigments, or a proper combination of black, dark blue, dark green and the like in order to make the reflectivity distribution uniform for this radiation. Alternatively, the ink can be mixed with selective light-absorbing material to achieve the object of this invention. Since the scattering distribution on the surfaces of the card substrate is changed when a design is formed on the card substrate by forming projections and depressions by etching, the object of this invention is fully achieved. Any method of forming the printed design layer 34 according to this invention is usable so long as information is confirmed on the printed design layer 34 when visible light is used and so long as the reflectivity distribution is uniform for storage and reproduction light beams.

The optical card of the fifth embodiment as shown in FIG. 11 has the same structure as that of FIG. 1. However, it is clear that it can be easily applied to the optical card having the same structure as that of FIG. 3. Needless to say, the same technical effect as the optical card of FIG. 11 can be obtained by replacing the printed design layer 52 of the optical card shown in FIG. 3 with the printed design layer 34 of FIG. 11.

According to any one of the five embodiments and the modifications, in an optical storage medium capable of optically recording/reproducing information, it is able to make the medium itself have high grade sense and value added by forming visible information in the information storage region. Further, noise due to visible information can be eliminated.

The combination of the second to fifth embodiments exhibits the technical advantage that the noise of the reproduction signals is much more reduced.

Prior to the explanation of the sixth to eleventh embodiments of the optical storage media according to this invention, there will be explained the conceptional process of the embodiments deduced from this invention.

With the optical card of the first embodiment, the information stored state can be known only when the optical card is inserted in the optical-card reading device and the memory capacity which information occupies cannot be known only from the optical card.

Published Unexamined Japanese Patent Application No. 64-23439 discloses an optical storage medium of another type, which is provided at the lower-surface side of the optical storage material 56 of an optical card 56 with a bar-like used-memory capacity indicating region 57. The color of the used-memory capacity indicating region 58 itself is blue and indicates that no information is stored on the optical storage material 57. When information is stored on the optical material 57 and pits are formed thereon, the color of the portions of the used capacity indicating region 58 which correspond to the pits changes from blue to white. The visual difference between the information stored portions and the information unstored portions allows for the indication of the information of the used memory capacity of the optical stored material 57.

However, in the general optical storage medium, visible light hits against the pits and is scattered. Thus, a storage residual can be visually known even if this proposal is not applied to the optical storage medium. Further, with this proposal, an approximate amount of used memory capacity can be known but the exact measure cannot. The width of the optical material of optical cards differs from each other according to the kinds of optical cards. Thus, it is desirable that the absolute values be indicated.

Further, when the conventional optical storage medium is used for periodical data recording such as the data storage of information of periodical health examinations which is used for health check of the optical card holder, it is inconvenient that the state of input data such as the state of health examinations cannot be visually known directly from the optical storage medium.

The sixth to eleventh embodiments were deduced from this invention in the course of the conceptional processes and are intended to allow for visual reading of the used state of optical storage material.

An optical card which is the sixth embodiment of the optical storage medium according to this invention will now be described with reference to FIG. 13.

Figure 13:
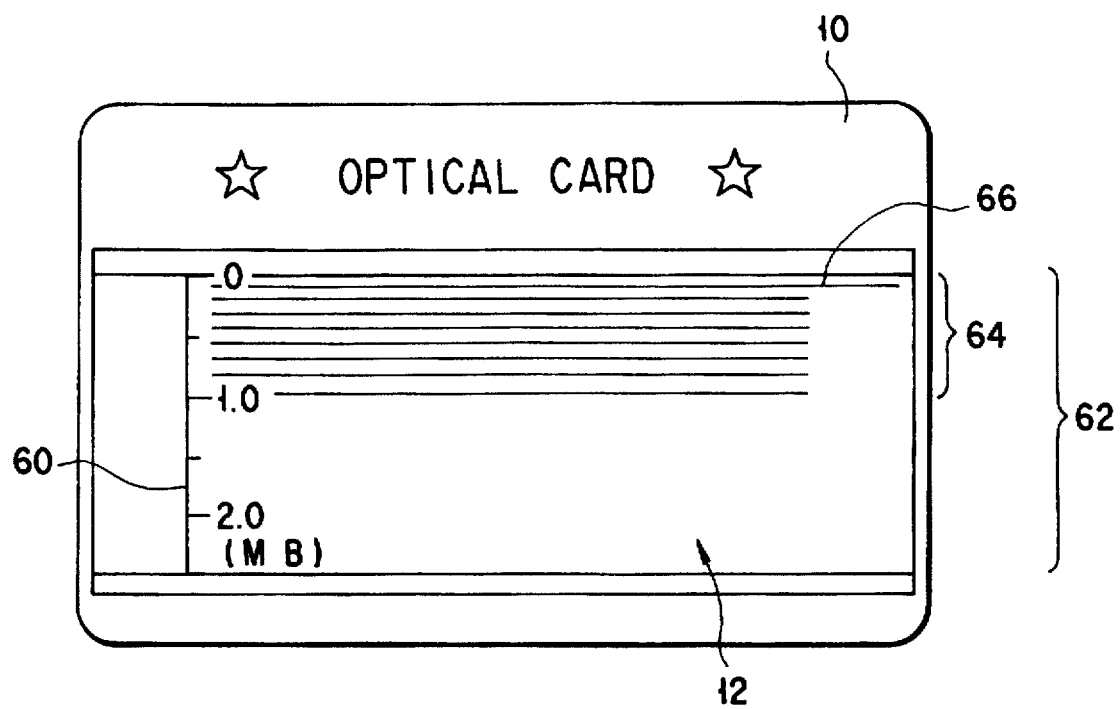
FIG. 13 is a top plan view of an optical card which is the sixth embodiment of an optical storage medium according to this invention.

As shown in FIG. 13, the optical card 10 has an optical storage region 12 on which information is stored and reproduced by optical means. It has the similar cross-sectional structure to the optical card as shown in FIG. 1.

An ordinate scale 60 is formed on the printed design layer. The whole memory capacity of the optical card of this embodiment is 2.5 mega-bytes (mega-bytes being hereinafter referred to as "MB") and numeral figures "0", "1.0" and "2.0" corresponding to 0 MB, 1 MB and 2 MB and letter "MB" are indicated on the ordinate scale. However, the indication may be made in percentage, or the numerical figures and the letters may be omitted so long as a scale is used. Further, the order of the numerical figure can be reversed in FIG. 13 in order to show the memory residual.

The optical card 10 of this embodiment has a whole optical storage region 62. The data is generally stored on the optical card from its top to its bottom in FIG. 13 in turn. The portion which has been filled with information forms a recorded optical storage region 64. The data is stored as pits and causes irregular reflection such that pit rows can be directly seen on the optical card. Therefore, the used memory capacity can be visually known directly from the optical card by overlapping the ordinate scale on the recorded storage region 64. It is understood that the memory of 1.0 MB is used in the embodiment in FIG. 13.

In the conventional optical card, the used memory capacity and the memory residual cannot be known only from the optical card but can be known by inserting the optical card in an optical card reading device or the like. However, in this embodiment, the used memory capacity or the memory residual can be easily known by observing the optical card.

Figure 14:
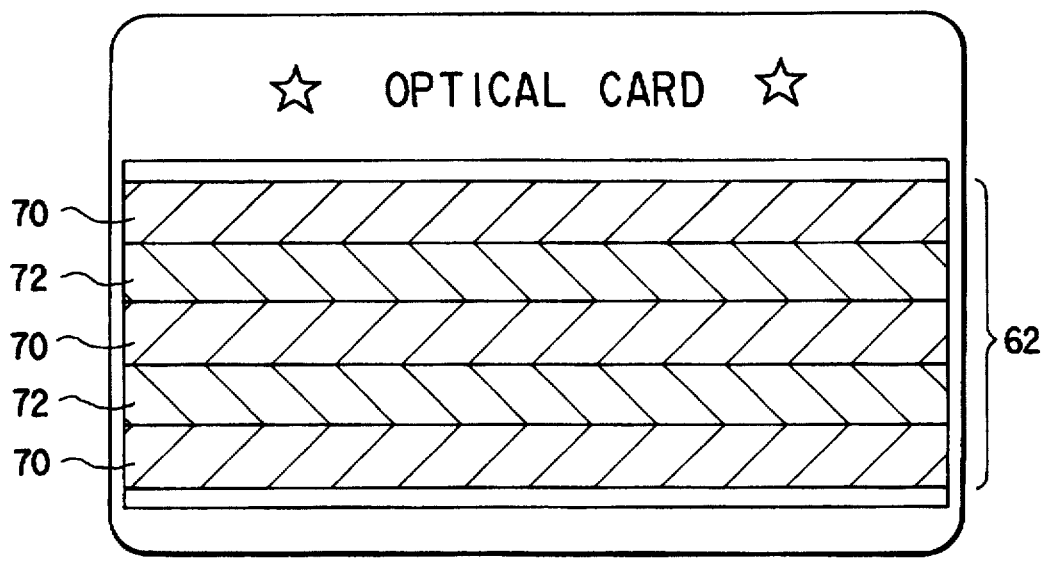
FIG. 14 is a top plan view of an optical card which is the seventh embodiment of an optical storage medium according to this invention.

The seventh embodiment will now be described. As shown in FIG. 14, the portion at which the memory information is to be indicated is divided by first color stripe portions 70 and second color stripe portions 72 in place of the ordinate scale 60 of the sixth embodiment. The colors of the first and second color stripe portions 70 and 72 are different from each other. Any combination of colors such as black and white or green and blue can be used so long as the color stripe sections 70 and 72 can be distinguished from each other.

The eighth embodiment will now be described with reference to FIG. 15. An abscissa scale 68 is used instead of the ordinate scale 60. The other structure is the same as that of the sixth embodiment. A recorded data portion 66 comprises blocks and data is stored from the right side to the left side in turn. With the optical card of this embodiment, the card can be applied to a data format in which data is arranged to form rows, the kinds of information is classified according to these rows and information is written in time series.

In the conventional optical card, the used memory capacity and the memory residual cannot be known only from the optical card but can be known by inserting the optical card in an optical card reading device or the like. However, in this embodiment, the used memory capacity can be easily known by observing the optical card, like in the case of the sixth embodiment.

There will now be described the ninth embodiment. As shown in FIG. 16, a plurality of memory residual values 74 are separately indicated. The other structure is the same as that of the sixth embodiment. In this embodiment, data is stored on the recorded data portion 66 from the top (the upper portion in the figure) toward the bottom of the optical card 10 in turn, but the data can be stored at random.

The memory residual value of this embodiment is calculated when the optical card 10 is inserted in an optical card reading device, not shown. According to the calculated memory residual value and if necessary, when the optical card 10 is taken out of the optical card reading device, some memory residual values 74 are erased as shown in FIG. 16. In this embodiment, individual residual values 74 are erased, but these values can be continuously erased from the right side. FIG. 16 shows that the memory is left over more than 1.0 MB in the optical card 10.

The used memory capacity or the memory residual can also be observed easily from the optical card itself, as in the case of the optical card of the sixth embodiment.

The tenth embodiment will now be described. As shown in FIG. 17, the printed design layer 2 is provided with a scale 76 indicating specific numerals such as specific dates and/or specific time. The scale 76 extends crosswise of the optical card 10 to form an ordinate scale. In this embodiment, the recorded data portion 66 comprises blocks. The specific dates and/or the specific times are stored on the specific blocks which are located at the specific positions. The data is, for example, the records of periodical health examinations of each person, such health examinations being carried out for the residents in specific places. The reading principle is the same as was described above. In the case of FIG. 17, it is immediately understood from the optical card 10 that the optical card holder did not take the health examination for the residents in 1990 or the data has not yet been stored.

A modification of the tenth embodiment will now be described. In this modification, an abscissa scale is added to the ordinate scale and the data indicating region is divided as shown in FIG. 18. From this optical card 10, it is immediately observed that the optical card holder did not take the health examination for the residents in the summer in 1900 or the data has not yet been stored.

The eleventh embodiment will now be described. As shown in FIG. 19, fixed visual information (fixed information) 78 and variable visual information (variable information) 80 are formed on the printed design layer 2 in this embodiment. The fixed information 78 is previously printed on the printed design layer 2. The variable information 80 indicates the memory residual and is made of rewritable material 82. In this embodiment, photochromic material made visible by changing light transmittance due to thermal reversible reaction is used as the rewritable material 82. The other structure is the same as that of the sixth embodiment.

The variable information 80 is rewritten by such a device 83 as shown in FIG. 20. This device 83 comprises an ordinary optical reading/writing device for optical cards 10 and means added thereto for rewriting the visible information 80 (shown in FIG. 19).

The variable information 80 is thermally erased. The heat is produced by rollers 88 which are used for erasing variable information 80 and inserting the optical card 10 in and taking out the same from the device 83.

As shown in FIG. 21, the writing of the variable information 80 is carried out by heating the rewritable material 82 when the writing is performed in the optical storage region 12 (shown in FIG. 19) by light beams 84 from an optical head.

The device 83 has a first optical head 86 and a second optical head 100. The first optical head 86 carries out reading/writing information from/on the optical storage region 12, and the second optical head 100 performs writing of the visible information 80. The first and second optical heads 86 and 100 are connected together so as to move as a body.

The optical card 10 is inserted in the device 83 from an inlet 96. The visible information 80 is erased by the rollers 88 while the optical card 10 is being inserted. Thereafter, the optical card 10 is placed on an optical card transportation base 90, and the memory residual as the visible information is written on the optical card 10 by means of the second optical head 100. When the optical card 10 is being taken out from the device 83, the temperature of the rollers 88 is lowered by a controller 92 such that the optical card 10 is taken out from the device 83 without erasing the visible information 80.

In the conventional optical card, the used memory capacity and the memory residual cannot be known only from the optical card but can be known by inserting the optical card in an optical card reading device or the like. However, in this embodiment, the used memory capacity can be easily known by observing the optical card.

In another application of this embodiment in which an optical card is used as a patient's chart, the date of the next health examination is recorded on the optical card as the variable visible information, whereby the optical card holder knows the information.

In this embodiment, a photochromic medium is used as rewritable material 82. The photochromic medium can indicate visible information by changing the light transmittance due to thermal reversible reaction. In place thereof, photochromic substance of spiropyran-series which exhibits letters and numerals by spot heating means such as a heat sensitive head or an optical head, or material using crystalline liquid or material including magnetic powder can be used.

In the above-mentioned sixth to eleventh embodiments, visible information is formed in the information storage region of the optical storage medium. Thus, the information now recorded on the optical card can be easily read visually without inserting the optical card in the optical card reading device.

This invention is not limited to the above-mentioned eleven embodiments but various embodiments and modifications are possible. The above embodiments employ the reflecting type reading method. However, the transmission type reading method is also used, of course. The optical storage medium according to this invention is not limited to the optical card but is applicable to many embodiments and modifications such as a compact disc (CD), an optical disc, a laser disc, a magneto-optical disc, optical data, etc.

In this invention, the design can be formed on the whole area of the optical storage medium, including the optical storage region thereof.

Further, by disposing the preventing material or light absorbing material between the optical storage material and the visible information layer, noise components generated from the visible information can be much reduced, thereby providing excellent read signals.

The used memories or the residual memories on the optical storage material can be known without inserting the optical card in the optical reading device.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An optical storage medium comprising:

first layer for storing optically readable information; and a second layer for storing visible information, said first and second layers being arranged one above the other, said first layer having a specific light transmittance to cause visible light to pass through said first layer and to be incident on said second layer so that visible information stored in said second layer is visibly observable through said first layer; and a third layer, disposed between said first and second layers, for transmitting visible light for reading visible information in said second layer, and for preventing light having a specific wavelength, used for reading optical information in said first layer, from being incident on said second layer.

2. An optical storage medium according to claim 1, wherein said third layer absorbs said light having said specific wavelength which is used for reading said information in said first layer, and transmits visible light for reading said visible information.

3. An optical storage medium according to claim 1, wherein said third layer reflects said light having said specific wavelength which is used for reading said information in said first layer, and transmits visible light for reading said visible information.

4. An optical storage medium according to claim 3, wherein said third layer has uniform reflectivity against said light having said specific wavelength.

5. An optical storage medium according to claim 1, wherein said visible information indicates a state of information records on said first layer.

6. An optical storage medium according to claim 5, wherein said visible information has a scale for indicating a state of information records on said first layer.

7. An optical storage medium according to claim 5, wherein said visible information separately indicates an amount of information of said first layer.

8. An optical storage medium according to claim 5, wherein said visible information indicates specific dates in accordance with information recorded on said first layer.

9. An optical storage medium according to claim 5, wherein said second layer is made of material on which said visible information is rewritable.

10. An optical storage medium according to claim 1, wherein said first and second layers are laminated on one another.

11. An optical storage medium according to claim 1, wherein the visible information of said second layer is comprised of printed matter.

* * * * *